United States Patent
Sonobe

(10) Patent No.: US 9,627,977 B2
(45) Date of Patent: Apr. 18, 2017

(54) QUASI-RESONANT SWITCHING POWER SUPPLY

(71) Applicant: FUJI ELECTRIC CO., LTD., Kawasaki-shi (JP)

(72) Inventor: Koji Sonobe, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 232 days.

(21) Appl. No.: 14/103,262

(22) Filed: Dec. 11, 2013

(65) Prior Publication Data

US 2014/0177286 A1 Jun. 26, 2014

(30) Foreign Application Priority Data

Dec. 20, 2012 (JP) ................... 2012-278734

(51) Int. Cl.
*H02M 3/335* (2006.01)
*H02M 1/00* (2006.01)

(52) U.S. Cl.
CPC ........... *H02M 3/33507* (2013.01); *H02M 2001/0032* (2013.01); *H02M 2001/0058* (2013.01);
(Continued)

(58) Field of Classification Search
CPC ............... H02M 3/338; H02M 3/3385; H02M 2001/0032; H02M 2001/0048; H02M 2001/0058; H02M 2007/4815; H02M 3/335; H02M 3/33523; H02M 3/33507; H02M 3/33515; H02M 2001/32; Y02B 70/16; Y02B 70/1433; Y02B 70/1491
See application file for complete search history.

(56) References Cited

U.S. PATENT DOCUMENTS 4,888,587 A * 12/1989 Kuraishi ................ 341/122
6,529,391 B2 * 3/2003 Yoshinaga ........ H02M 3/3385
363/21.15

(Continued)

FOREIGN PATENT DOCUMENTS

| JP | 2002-171761 A | 6/2002 |
|---|---|---|
| JP | 2010-045939 A | 2/2010 |
| WO | WO-2004/023634 A1 | 3/2004 |

*Primary Examiner* — Gustavo Rosario Benitez
(74) *Attorney, Agent, or Firm* — Rabin & Berdo, P.C.

(57) ABSTRACT

A quasi-resonance switching power supply quickly determines the number of bottom skips corresponding to the load condition even in abrupt load change. The quasi-resonance switching power supply is provided with a bottom skipping control function and a capacitor to hold a voltage corresponding to the load condition of the switching element over one switching period of the switching element. The quasi-resonance switching power supply comprises a bottom skipping number determining circuit that compares the voltage held on the capacitor with comparison reference voltages selected from a plurality of reference voltages for determining the number of bottom skips, and revises the comparison reference voltage according to the comparison result. The processing of comparison and revision is executed multiple times in one switching period of the switching element. Thus, the bottom skipping number determining circuit determines the number of bottom skips corresponding to the voltage held on the capacitor.

12 Claims, 11 Drawing Sheets

(52) U.S. Cl.
CPC ....... *Y02B 70/1433* (2013.01); *Y02B 70/1491* (2013.01); *Y02B 70/16* (2013.01)

(56) References Cited

U.S. PATENT DOCUMENTS

| | | | |
|---|---|---|---|
| 7,075,802 B2 * | 7/2006 | Yamashita | H02M 3/33523 363/21.12 |
| 7,285,991 B2 * | 10/2007 | Yamashita | H02M 3/33523 323/285 |
| 2002/0067626 A1 | 6/2002 | Koike et al. | |
| 2002/0186571 A1 * | 12/2002 | Tsuge | 363/21.01 |
| 2005/0259448 A1 | 11/2005 | Koike | |
| 2010/0039835 A1 | 2/2010 | Shimada | |
| 2010/0053998 A1 * | 3/2010 | Shimada | H02M 3/33507 363/21.01 |
| 2010/0289684 A1 * | 11/2010 | Ikeda | 341/161 |
| 2012/0113689 A1 * | 5/2012 | Chen | H02M 3/33523 363/21.17 |
| 2012/0250362 A1 * | 10/2012 | Chen | H02M 1/4258 363/21.03 |
| 2013/0051088 A1 * | 2/2013 | Yamashita | H02M 1/36 363/21.13 |
| 2013/0148386 A1 * | 6/2013 | Chen | H02M 3/33523 363/21.12 |

* cited by examiner

QUASI-RESONANT SWITCHING POWER SUPPLY

CROSS-REFERENCE TO RELATED APPLICATION

This application is based on, and claims priority to, Japanese Patent Application No. 2012-278734, filed on Dec. 20, 2012, contents of which are incorporated herein by reference.

BACKGROUND OF THE INVENTION

1. Field of the Invention

The present invention relates to a quasi-resonance switching power supply performing bottom skip control corresponding to a load condition.

2. Description of the Related Art

A quasi-resonant switching power supply utilizes a resonant phenomenon in a circuit composed of an inductance and a resonance capacitor that are connected in series to an ON/OFF-driven switching element. The switching frequency of the quasi-resonant switching power supply increases as a load becomes lighter. As a result, the switching loss in the switching element increases in a light load condition and the conversion efficiency degrades in the quasi-resonant switching power supply. When the load decreases below 50% of the rated load, in particular, the conversion efficiency remarkably decreases. In addition, the increased loss in the switching element causes overheating of the switching element.

Accordingly, Patent Document 1 (identified further on) discloses a so-called bottom skip control, which pays attention to a resonance waveform involved in turning OFF of a switching element such as a MOSFET or an IGBT, and the switching element is turned ON by skipping a timing of a bottom of the drain voltage, which is a resonant voltage, of the switching element according to a load condition. The bottom skip control restrains increase in the switching frequency in the light load condition, avoiding deterioration of the conversion efficiency.

In the technique disclosed in Patent Document 1, the magnitude of the load is detected from the peak value of a switching current. In a heavy load condition or a normal load condition, the switching element is turned ON, without bottom skipping, at the timing when the first bottom of the resonant voltage is detected. In the light load condition, the first bottom of the resonant voltage is skipped and the switching element is turned ON at a timing of a later bottom. The number of skipped bottoms is set at a larger value as the load becomes lighter. In this way, the increase in the switching frequency in a light load condition is controlled.

Patent Document 2 (identified further on) discloses transition from a quasi-resonance operation state to a bottom skip operation in which the transition operation is delayed corresponding to a load condition. This procedure makes the switching operation stable and the peak current variation in the switching element smooth. Patent Document 3 (identified further on) discloses a procedure of judging a load condition in which the ON width of the switching element is compared with a preset reference time and the result of the judgment is used to vary the switching frequency corresponding to the load condition.

[Patent Document 1]
International Patent Application Publication WO2004/023634

[Patent Document 2]
Japanese Unexamined Patent Application Publication No. 2010-045939

[Patent Document 3]
Japanese Unexamined Patent Application Publication No. 2002-171761

The switching power supply disclosed in Patent document 1, however, needs a detection circuit for switching current, resulting in a complicated structure. Since it is difficult to detect the peak of a switching current with a high accuracy, determination of the number of bottom skips is accompanied by a hysteresis. In the technology disclosed in Patent Document 2, it takes time to determine the number of bottom skips corresponding to the load condition. As a consequence, abrupt change in the load condition unfavorably causes great variation in the output voltage due to the delayed response. The technology disclosed in Patent Document 3, which changes a switching frequency by controlling an oscillator of a voltage controlled type, is not capable of being applied to a quasi-resonance type switching power supply.

SUMMARY OF THE INVENTION

The present invention has been produced in view of the foregoing and an object of the present invention is to provide a quasi-resonant switching power supply that performs appropriate bottom skip control by quickly determining the number of skips corresponding to the load condition without delay of response even in an abrupt change of the load.

In order to achieve the object, a quasi-resonant switching power supply of the present invention utilizes a resonance phenomenon in a circuit including an inductance and a resonance capacitor connected in series to an ON-OFF driven switching element, and turns ON the switching element for example, a MOSFET or an IGBT, at a timing of a bottom of a resonant voltage. The quasi-resonance switching power supply comprises a bottom detecting circuit that detects a bottom of the resonant oscillation voltage developed upon turning OFF of the switching element, a bottom skipping number determining circuit that determines the number of bottom skips corresponding to a load of the switching element, and a turn ON control circuit that turns ON the switching element when a number of bottoms detected by the bottom detecting circuit reaches a number of bottom skips determined by the bottom skipping number determining circuit.

The bottom skipping number determining circuit comprises a capacitor that holds a voltage corresponding to the load of the switching element over one switching period of the switching element, and sequentially compares the voltage held on the capacitor with a plurality of reference voltages for determining the number of bottom skips in one switching period of the switching element to determine the number of bottom skips corresponding to the voltage held on the capacitor.

The plurality of reference voltages for determining the number of bottom kips correspond to delay times after a timing of turning OFF of the switching element. The bottom skipping number determining circuit may comprise an up-down counter that increases or decreases the number of bottom skips according to a comparison result between the voltage held on the capacitors with an upper limit voltage and a lower limit voltage set by selecting from the plurality of reference voltages, a reference voltage selecting circuit that changes reference voltages set as the upper limit voltage and the lower limit voltage corresponding to the number of bottom skips set in the up-down counter, and a selection operation control circuit that instructs the reference voltage selecting circuit to execute changing processing for the reference voltages at multiple times in one switching period of the switching element to settle the number of bottom skips set in the up-down counter.

The plurality of reference voltages for determining the number of bottom skips may be (N+1) different voltages that divide the range of the voltages held on the capacitors into N steps corresponding to the magnitude of the load of the switching element, N being an integer of two or larger, and the plurality of voltages can include the power supply voltage and the ground potential, zero volts. The reference voltage selecting circuit may select, from the plurality of reference voltages, the upper limit voltage and the lower limit voltage to specify a variation-permitting range of the voltage held on the capacitors according to the value of the up-down counter indicating the number of bottom skips.

The up-down counter performs processing of decrementing of the number of bottom skips and processing of incrementing of the number of bottom skips triggered by the selection operation control circuit repeatedly at multiple times in one switching period, the processing of decrementing being executed when the voltage held on the capacitor is higher than the upper limit voltage and the processing of incrementing being executed when the voltage held on the capacitor is lower than the lower limit voltage.

The voltage corresponding to the load of the switching element is a voltage corresponding to the period of time from a timing of turning ON of the switching element to a timing of detecting a first bottom of the resonant oscillation voltage after turning OFF of the switching element.

The voltage corresponding to the load of the switching element is a voltage corresponding to an ON period of time of the switching element.

The voltage corresponding to the load of the switching element is a voltage corresponding to a current running through the switching element upon turning ON of the switching element.

The capacitor is composed of first and second capacitors provided in parallel, and the voltage corresponding to the period of time from a timing of turning ON of the switching element to a timing of detecting a first bottom of the resonant oscillation voltage after turning OFF of the switching element is accumulated on the first and second capacitors alternately in every switching period of the stitching element and held over the next one switching period of the switching element to deliver for determining the number of bottom skips in the bottom skipping number determining circuit.

A quasi-resonant switching power supply as described above determines an appropriate number of bottom skips corresponding to a load condition within one switching period of the switching element. Consequently, bottom skip control can be performed with a small delay even when the load changes rapidly. In addition, because the number of bottom skips can be changed rapidly following the load change, the output voltage changes in a small range.

The voltage corresponding to the load of the switching element is held on the capacitor over one switching period of the switching element. Consequently, the comparison process between the voltage held on the capacitor and the reference voltage and changing process of the number of skips based on the comparison result can be conducted plural times within one switching period of the switching element. Thus, a quasi-resonant switching power supply of the present invention determines the number of bottom skips corresponding to the load readily and with a margin. Moreover, these advantages are obtained with a simple construction.

DETAILED DESCRIPTION OF THE INVENTION

The following describes in detail a quasi-resonant switching power supply according to a preferred embodiment of the invention with reference to accompanying drawings.

Figure 1:
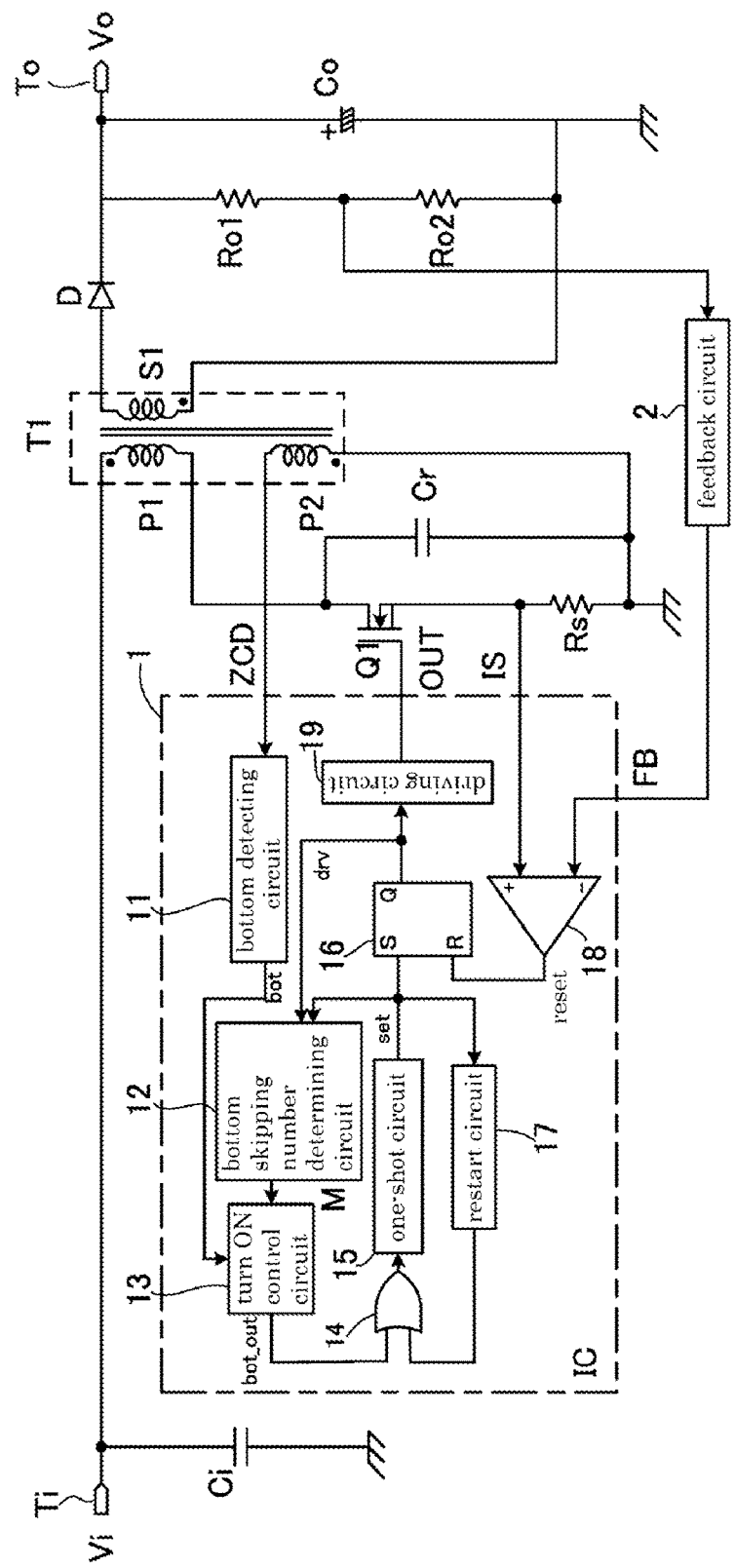
FIG. 1 shows a schematic construction of a quasi-resonant switching power supply according to an embodiment of the present invention.

FIG. 1 shows a schematic construction of a quasi-resonant switching power supply according to an embodiment of the present invention. The quasi-resonant switching power supply is provided with a switching element Q1, which can be a MOSFET, that switches an input voltage Vi given at an input terminal Ti through a primary winding P1 of a transformer T1. The quasi-resonant switching power supply rectifies an AC voltage generated across the secondary winding S1 of the transformer T1 with a diode D and then makes the rectified voltage smooth with an output capacitor Co to obtain an output voltage Vo, which is delivered to a load (not shown in the figure) from an output terminal To. The primary winding P1 of the transformer T1 is connected to a resonance capacitor Cr in series. The resonance capacitor Cr forms a resonance circuit together with an inductance of the transformer T1 when the switching element Q1 turns OFF.

An input capacitor Ci makes the input voltage Vi smooth. Voltage dividing resistors Ro1 and Ro2 detect the divided output voltage Vo. A shunt resistor Rs is connected in series to the switching element Q1, which can be a MOSFET, to detect the current running through the switching element Q1. The shunt resistor Rs generates a voltage across the resistor corresponding to the current running through the switching element Q1.

The switching element Q1 is ON-OFF driven by a control circuit 1 that is constructed as a so-called power supply IC. The control circuit 1 detects a bottom, a minimum voltage, of a resonant voltage that develops at turning OFF of the switching element Q1, from a voltage appearing on an auxiliary winding P2 of the transformer T1. At this timing of bottom detection, the switching element Q1 is turned ON.

The control circuit 1 receives a FB signal from a feedback circuit 2, the FB signal being detected with the voltage dividing resistors Ro1 and Ro2 and corresponding to the output voltage Vo. The control circuit 1 also receives an IS signal that is detected with the shunt resistor Rs and indicating the current running through the switching element Q1. The control circuit 1 controls an OFF timing according to the FB signal and the IS signal.

In more detail, the control circuit 1 has a bottom detecting circuit 11 that detects a bottom, a minimum voltage, of a resonant voltage generated at the timing of turning OFF of the switching element Q1, from the voltage across the auxiliary winding P2 given at a zero current detecting terminal (a ZCD terminal). The control circuit 1 also has a bottom skipping number determining circuit 12 that determines the number of bottom skips M, which is a natural number including zero, corresponding to a load condition. The bottom skipping number determining circuit 12 determines the number M of bottom skips for one switching period of the switching element Q1 based on a driving signal 'drv' for ON/OFF controlling the switching element Q1 and on a setting signal 'set', which will be described later.

A turn ON control circuit 13 counts the number of bottom detection of the resonant voltage after turning OFF of the switching element Q1, based on a bottom detection signal 'bot' detected by the bottom detecting circuit 11. After the number of bottom detection has reached the number of bottom skips M, the turn ON control circuit 13, upon detecting the next bottom, delivers a signal 'bot_out' that causes turning ON of the switching element Q1. In other words, the turn ON control circuit 13 delivers the signal 'bot_out' when the number of bottom detections becomes M+1.

The signal 'bot_out' is delivered to a one-shot circuit 15 through an OR circuit 14. The one-shot circuit 15 is triggered by input of the signal 'bot_out' and generates a setting signal 'set' with a pulse width of 300 ns, for example. The setting signal 'set' is used for setting an RS flip-flop 16 of a reset preference type; the signal is given as well to the bottom skipping number determining circuit 12. The setting signal 'set' is further delivered to a restart circuit 17.

The restart circuit 17 delivers a restart signal when a new setting signal 'set' is not given for a predetermined period of time, for example 30 µsec, after receiving a previous setting signal 'set', which means interruption of the signal 'bot_out'. The restart signal is delivered to the one-shot circuit 15 through the OR circuit 14, to restart the one-shot circuit 15.

The flip-flop 16 is set by the setting signal 'set' and reset by the resetting signal 'reset' delivered from a comparator 18. The flip-flop 16 generates the driving signal 'drv'. The driving signal 'drv' from the flip-flop 16 is amplified in a driving circuit 19, which is an output amplifier, and applied to the gate of the switching element Q1, which can be a MOSFET, as an output signal OUT for ON-OFF driving the switching element Q1.

The comparator 18 compares the FB signal delivered through the feedback circuit 2 and the IS signal detected with the shunt resistor Rs. When the voltage of the IS signal exceeds the voltage of the FB signal, the comparator 18 delivers the resetting signal 'reset'. Thus, the flip-flop 16 is set at the timing of delivering the signal 'bot_out' on detection of a bottom of the resonant voltage, and reset at the timing the voltage of the IS signal exceeds the voltage of the FB signal.

The timing at which the IS signal exceeds the FB signal is a timing to regulate an ON period or an ON width of the switching element Q1 according to the output voltage Vo. Consequently, the switching element Q1 is turned OFF after passing the ON period corresponding to the output voltage Vo based on the FB signal; and the switching element Q1 is turned ON at a timing of a bottom of the resonant voltage that is generated in a resonance circuit composed of a leakage inductance of the transformer T and the resonance capacitor Cr caused by the turning OFF of the switching element Q1. Therefore, a quasi-resonant switching is achieved with reduced loss in the switching element Q1.

Figure 2:
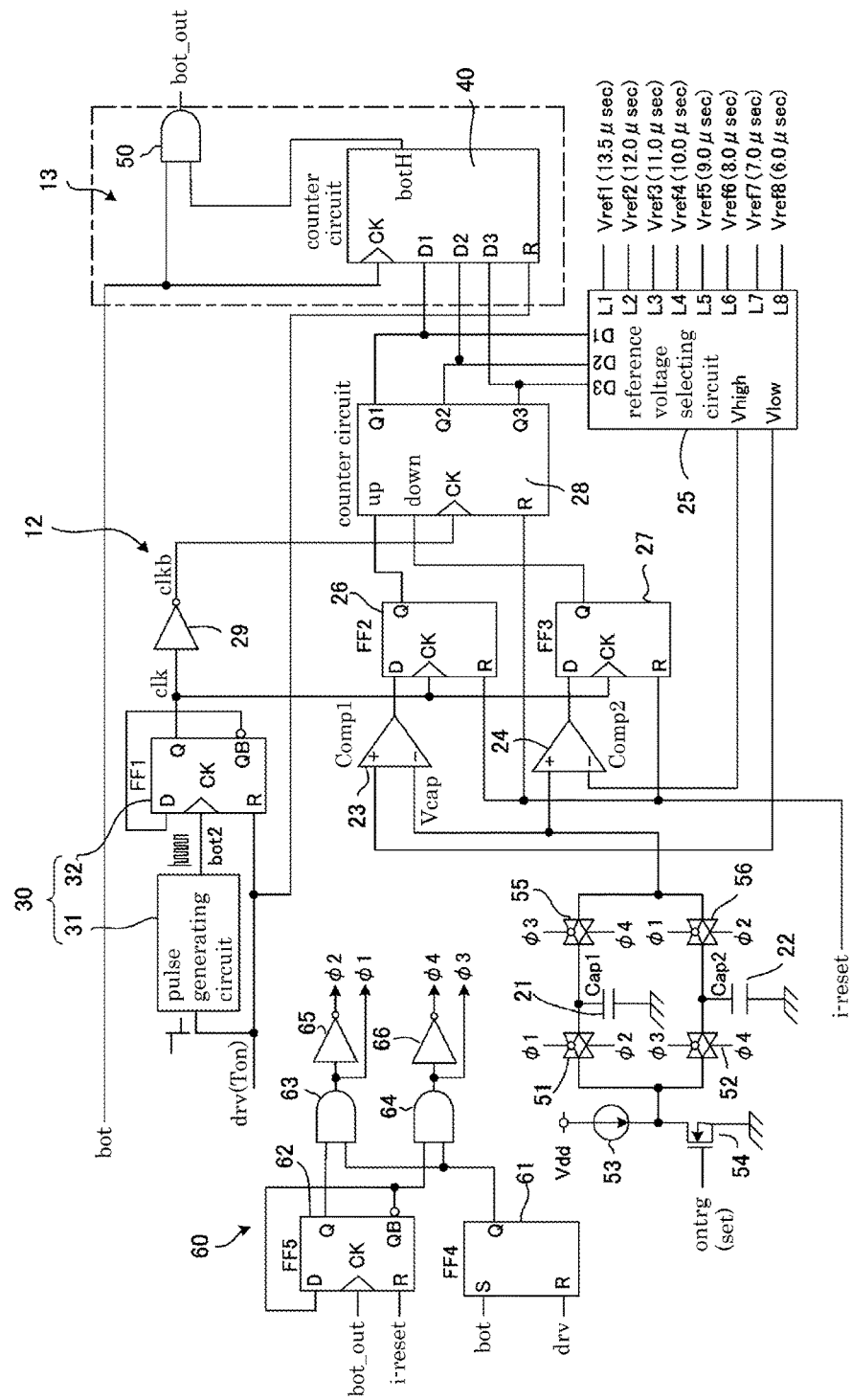
FIG. 2 shows schematic constructions of a circuit for determining the number of bottom skips and a turn ON control circuit in a quasi-resonant switching power supply according to an embodiment of the present invention.

FIG. 2 shows an example of construction of the bottom skipping number determining circuit 12 and the turn ON control circuit 13. The bottom skipping number determining circuit 12 comprises, in parallel, a first capacitor (Cap1) 21 and a second capacitor (Cap2) 22 that hold a voltage corresponding to the load of the switching element Q1 over one switching period of the switching element Q1. The first and second capacitors 21 and 22 accumulate in every one switching period of the switching element Q1, a voltage Vcap corresponding to the load of the switching element Q1, for example, corresponding to an ON width or an ON-OFF width of the switching element Q1.

More specifically, the first and second capacitors 21 and 22 are charged with a constant current supplied by a constant current source 53 through first and second analogue switches 51 and 52 that are complimentarily turned ON and OFF. The capacitors 21 and 22 are connected to a switching element 54, which is a MOSFET, for example, in parallel through the analogue switches 51 and 52. The switching element 54 turns ON receiving a ON trigger signal 'ontrg' for turning ON the switching element Q1 to discharge the charges accumulated on the capacitors 21 and 22, thereby initializing the charged voltages Vcap on the capacitors 21 and 22 to zero volts.

After initialization to zero volts by the ON trigger signal 'ontrg', the capacitors 21 and 22 are charged again upon disappearance of the ON trigger signal 'ontrg' with the constant current from the constant current source 53. The charged voltages Vcap on the capacitors 21 and 22 charged by the constant current source 53 is delivered to first and second comparators (Comp1 and Comp2) 23 and 24 through third and fourth analogue switches 55 and 56 that are complimentarily turned ON and OFF.

The first through fourth analogue switches 51, 52, 55, and 56 are turned ON and OFF, for example, by switching signals ϕ1, ϕ2, ϕ3, and ϕ4 having a pulse width corresponding to the ON/OFF width of the switching element Q1. The switching signals ϕ1, ϕ2, ϕ3, and ϕ4 are generated by a timing circuit 60 composed of flip-flops (FF4 and FF5) 61 and 62, AND circuits 63 and 64, and inverter circuits 65 and 66.

The flip-flop (FF4) 61 in the timing circuit 60 is set by the bottom detecting signal 'bot' and reset by the driving signal 'drv'. Consequently, the flip-flop 61 delivers an H level signal in every ON/OFF period of the switching element Q1, i.e., a period from the timing of detection of the first bottom of the resonant voltage to the timing of turning ON of the switching element Q1. The flip-flop (FF5) 62 is reset (or initialized) by an initializing signal 'i-reset' that is generated at the startup of the switching power supply, and conducts inverting operation every time a signal 'bot_out' is given, the signal 'bot_out' regulating an ON timing of the switching element Q1 as described later. As a consequence, the output of the flip-flop 62 is inverted after every one switching period of the switching element Q1.

The AND circuit 63 conducts logical AND operation of the output of the flip-flop (FF4) 61 and the output of the flip-flop (FF5) 62; and the AND circuit 64 conducts logical AND operation of the output of the flip-flop 61 and the inverted output of the flip-flop 62. Thus, the AND circuits 63 and 64 delivers the switching signals T1 and T3 corresponding to the ON-OFF width of the switching element Q1 alternately at every one switching period of the switching element Q1. The inverter circuits 65 and 66 generate the switching signals $\phi 2$ and $\phi 4$ that are inverted from the switching signals $\phi 1$ and $\phi 3$ and paired with the switching signals $\phi 1$ and $\phi 3$.

The switching signals $\phi 1$ and $\phi 3$ are used for ON/OFF switching of the first and fourth analogue switches 51 and 56; and the switching signals $\phi 2$ and $\phi 4$ are used for ON/OFF switching of the second and third analogue switches 52 and 55. Thus, the first and fourth analogue switches 51 and 56, and the second and third analogue switches 52 and 55 are switched ON and OFF alternately at every switching period of the switching element Q1 in a complimentary manner.

As a result, the capacitors 21 and 22 are connected to the constant current source 53 through the first and second analogue switches 51 and 52 alternately at every one switching period of the switching element Q1. The capacitors 21 and 22 are charged over the period from the timing of turning ON of the switching element Q1 to the timing of detection of a bottom of the resonant voltage developed upon turning OFF of the switching element Q1. Thus, the capacitors 21 and 22 are charged alternately to a voltage Vcap corresponding to the ON-OFF width of the switching element Q1.

One of the first and second analogue switches 51 and 52 that is on the side of one of the capacitors 21 and 22 that has been charged is held in an OFF state in the next one switching period. Consequently, the voltage Vcap charged on the capacitor 21 or 22 is held during the next one switching period of the switching element Q1. In the next one switching period, one of the third and fourth analogue switches 55 and 56 that is on the side of one of the capacitors 21 and 22 that has been charged takes on an ON state. As a result, the voltage Vcap held in the capacitor 21 or 22 is delivered to the first and second comparators (Comp1 and Comp2) 23 and 24 through the third or fourth analogue switch 55 or 56.

Figure 3:
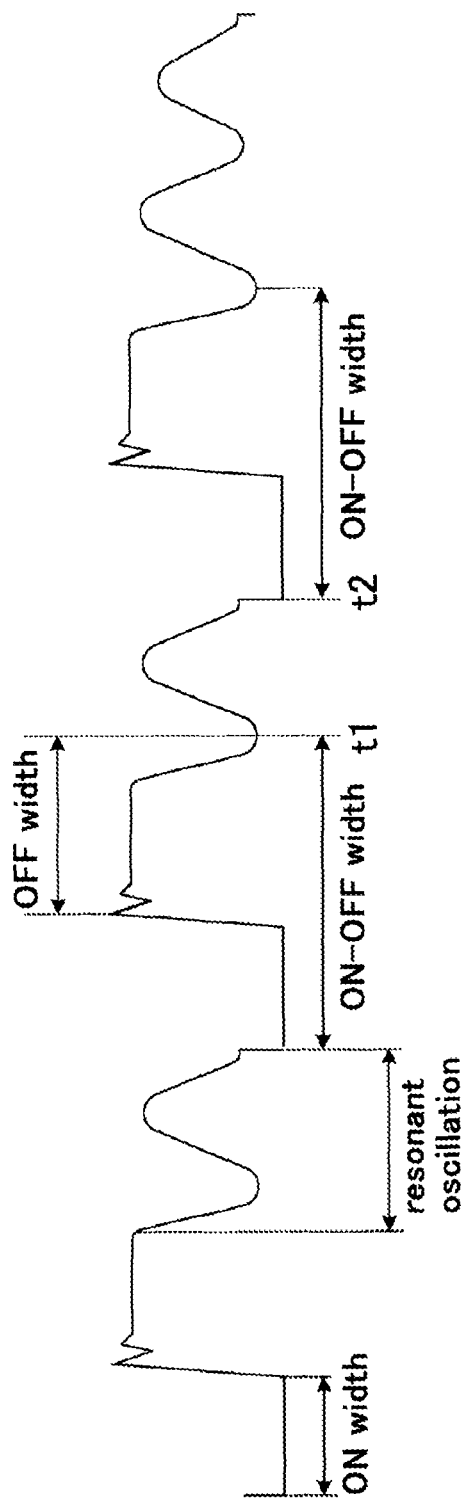
FIG. 3 shows variation of a drain voltage of a switching element in turning ON and OFF processes and a relationship between an ON width, an OFF width, and an ON-OFF width.

An ON width of the switching element Q1 is, as shown in FIG. 3, a period in which the switching element Q1 is in an ON state and the drain voltage of the switching element Q1, which can be a MOSFET, the voltage being a terminal voltage of the primary winding P1, is at a ground potential $V_{GND}$. An OFF width of the switching element Q1 is a period from turning OFF of the switching element Q1, which develops resonant oscillation of the drain voltage of the switching element Q1, until the first bottom, or minimum, of the resonant oscillation voltage. An ON-OFF width of the switching element Q1 is a period from turning ON of the switching element Q1 until the first bottom, or minimum, of the resonant oscillation voltage at which the switching element Q1 turns OFF. Thus, the ON-OFF width is a period of a sum of the ON width and the OFF width.

The ON width and the ON-OFF width vary corresponding to a magnitude of the load: a heavy load, which means high output voltage Vo, results in a long time width. As described previously, one of the first and second capacitors 21 and 22 is charged with a constant current over the ON-OFF period. As a result, the voltage Vcap that is charged and held on the first or second capacitors 21 and 22 becomes higher as the load becomes heavier, i.e., the ON width or the ON-OFF width of the switching element Q1 becomes longer.

The first and second comparator (Comp1 and Comp2) 23 and 24 compare the voltage Vcap held on the first or the second capacitor 21 or 22 with a comparison reference voltage Vhigh and Vlow selected by a reference voltage selecting circuit 25, which will be described later. More specifically, the first comparator 23 turns the output thereof to an H level when the Vcap decreases below the comparison reference voltage Vlow; and the second comparator 24 turns the output thereof to an H level when the Vcap increases above the comparison reference voltage Vhigh.

First and second D flip-flops (FF2, FF3) 26 and 27 receive a clock signal 'clk' delivered by a selection operation control circuit 30 and conduct latching operation to hold the output signals from the first and second comparators 23 and 24. The selection operation control circuit 30 includes a pulse generating circuit 31 that generates a pulse signal 'bot2' with a shorter period than the bottom detection signal 'bot' upon receiving the driving signal 'drv'. The selection operation control circuit 30 also includes a T flip-flop (FF1) 32 that is reset by the bottom detection signal 'bot' and conducts an inverting operation every instance of receiving the pulse signal 'bot2' to generate the clock signal 'clk.'

Thus, the first and second D flip-flops 26 and 27 operate during the period of the ON-OFF width of the switching element Q1, after the driving signal 'drv' becomes an H level until the bottom detection signal 'bot' is detected. The flip-flops 26 and 27 receive the outputs of the first and second comparator 23 and 24, respectively, at multiple times receiving the clock signal 'clk', and hold the outputs of the comparators. The output of the first comparator 23 held in the first flip-flop 26 is given to a counter circuit 28 as an up-count instruction signal 'up'. The output of the second comparator 24 held in the second flip-flop 27 is given to the counter circuit 28 as a down-count instruction signal 'down'.

Figure 4:
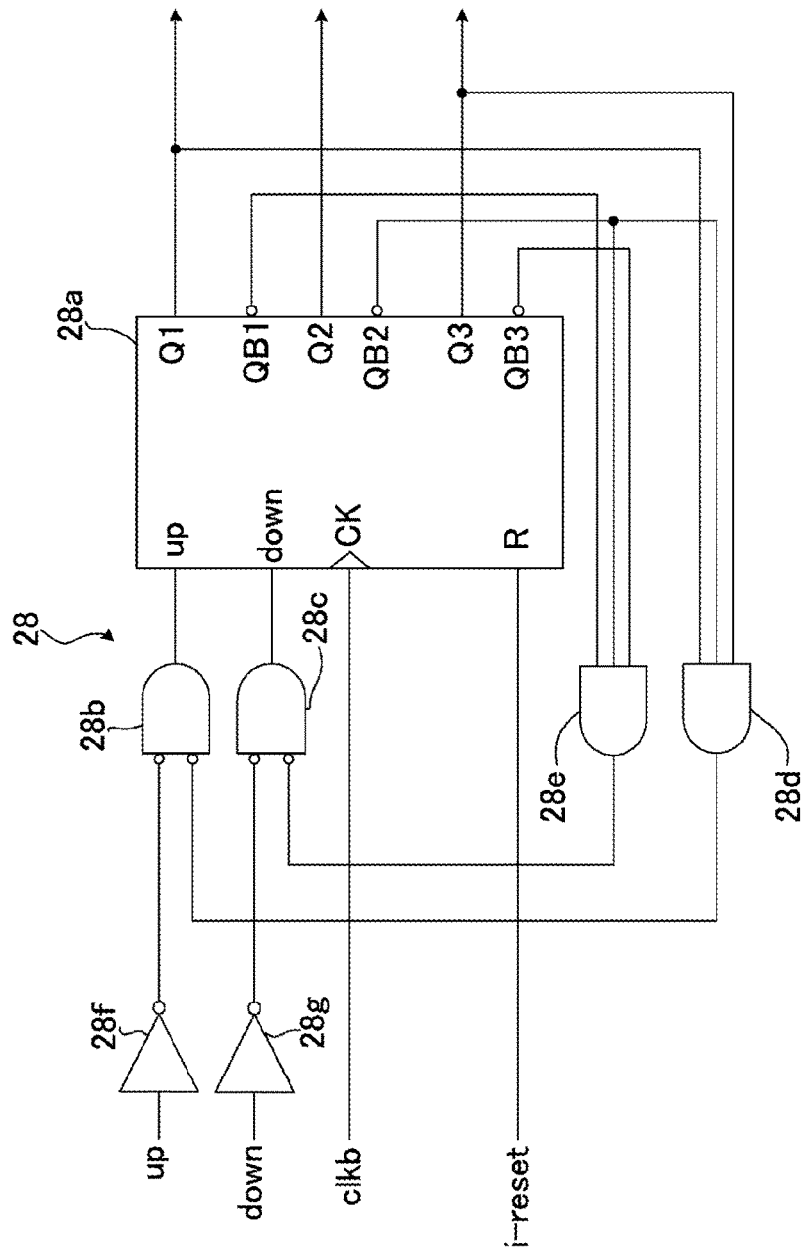
FIG. 4 shows a schematic construction of an example of a counter circuit in a circuit for determining the number of bottom skips.

The counter circuit 28 is composed, as shown in FIG. 4, mainly of an up-down counter 28a of three binary bits. The counter circuit 28 receives, as well as the signals of the first and second D flip-flops 26 and 27, an initial resetting signal 'i-reset', which is issued in a predetermined period at the startup of the switching power supply, at the reset terminal of the up-down counter 28a to reset (or initialize) the counter. By this resetting operation, the counter circuit 28 initializes a counting value M represented by three bit binary output [Q1, Q2, Q3] to [0].

The counter circuit 28 conducts an incrementing (+1) or decrementing (−1) operation on the counting value every instance of receiving a clock signal 'clkb' that is delivered by the selection operation control circuit 30 and then inverted through the inverter circuit 29. Thus, the counter circuit 28 performs an up-down counting operation to conduct incrementing or decrementing operation on the counting value M every instance of receiving the clock signal 'clk' according to the up-counting instruction signal 'up' or the down-counting instruction signal 'down'.

More specifically, the counter circuit 28 comprises the three bit up-down counter 28a and AND circuits 28d and 28e that control input gate circuits 28b and 28c corresponding to the binary output [Q1, Q2, Q3] of the up-down counter 28a. The up-counting instruction signal 'up' and the down-counting instruction signal 'down' delivered to the counter circuit 28 are given to the input gate circuits 28b and 28c after inverting through inverter circuits 28f and 28g.

The AND circuit 28d makes the input gate circuit 28b disabled when the binary output [Q1, Q2, Q3] of the up-down counter 28a is [101]. This gate control by the AND circuit 28d, in the case of a counting number M of the up-down counter 28a of [5], which is equivalent to the binary output [101], inhibits inputting of the up-counting instruction signal 'up' inverted through the inverter circuit 28f into the up-down counter 28a.

The AND circuit 28e makes the input gate circuit 28c disabled when the binary output [Q1, Q2, Q3] of the up-down counter 28a is the minimum value [000]. This gate control by the AND circuit 28e, in the case of a counting number M of the up-down counter 28a of [0], which is equivalent to the binary output [000], inhibits inputting of the down-counting instruction signal 'down' inverted through the inverter circuit 28g into the up-down counter 28a.

The up-down counter 28a conducts an up and down operation on the counting value M only for the counting value M between [0] and [5], which is equivalent to a range of binary outputs of [000] to [101], six steps. The up and down operation is conducted according to the up count instruction signal 'up' and the down count instruction signal 'down'. The six steps correspond to the maximum value [5] of the number of bottom skips in the bottom skip control.

The reference voltage selecting circuit 25 selects two voltages for the comparison reference voltages Vhigh and Vlow from predetermined different reference voltages Vref1 through Vref8, the power supply voltage Vdd, and the ground potential $V_{GND}$, according to the binary output [Q1, Q2, Q3], which is a counting number M, of the counter circuit 28. The reference voltages Vref1 through Vref8 are, for example, voltages corresponding to delay times from the turn OFF timing of the switching element Q1.

The reference voltages Vref1 through Vref8 are, for example, in the relationship:

$$Vdd > Vref1 > Vref2 > \ldots > Vref8 > V_{GND}(=0\ V).$$

The reference voltages Vref1 through Vref8 are determined for comparison with the charging voltage Vcap on the first and second comparators 23 and 24 corresponding to the time duration after the turn OFF timing of the switching element Q1, the time duration being, for example, 13.5 µs, 12.0 µs, 11.0 µs, 10.0 µs, 9.0 µs, 8.0 µs, 7.0 µs, and 6.0 µs.

Figure 5:
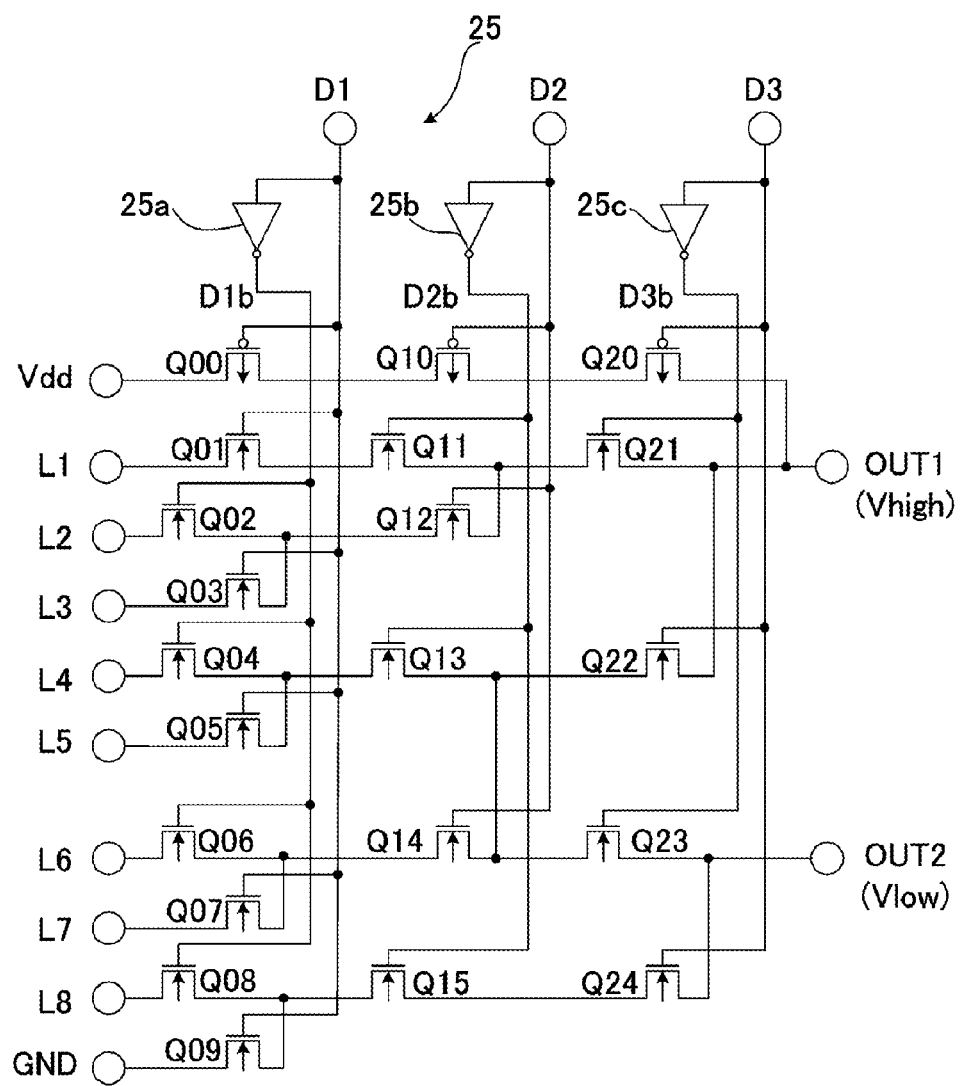
FIG. 5 shows a schematic construction of an example of a reference voltage selection circuit in the circuit for determining the number of bottom skips.

FIG. 5 shows an example of construction of the reference voltage selecting circuit 25 for conducting selection operation of the reference voltages Vref1 through Vref8. The reference voltage selecting circuit 25 receives the outputs [Q1, Q2, Q3] of the counter circuit 28 as selection control signals [D1, D2, D3]. The reference voltage selecting circuit 25 generates control signals [D1b, D2b, D3b] that are the selection control signals [D1, D2, D3] inverted by the NOT circuits 25a, 25b, and 25c provided in the input stage of the reference voltage selecting circuit 25.

The reference voltage selecting circuit 25 ON-OFF-controls 21 switching elements Q00 through Q15 and Q20 through Q24 according to the selection control signals [D1, D2, D3] and the inverted control signals [D1b, D2b, D3b]. By the ON-OFF control of the 21 switching elements Q00 through Q15 and Q20 through Q24, the comparison reference voltages Vhigh and Vlow to be delivered from output terminals OUT1 and OUT2 of the reference voltage selecting circuit 25 are selected from the reference voltages Vref1 through Vref8, the power supply voltage Vdd, and the ground potential $V_{GND}$.

More specifically, the reference voltage selecting circuit 25 is constructed as follows.

Three switching elements Q00, Q10, and Q20 are arranged in series between a Vdd terminal at which the power supply voltage Vdd of the reference voltage selecting circuit 25 is applied and the output terminal OUT1. Three switching elements Q01, Q11, and Q21 are arranged in series between an L1 terminal to which the reference voltage Vref1 is applied and the output terminal OUT1. Two switching elements Q02 and Q12 are arranged in series between an L2 terminal to which the reference voltage Vref2 is applied and the series connection point between the switching elements Q11 and Q21.

One switching element Q03 is arranged between an L3 terminal to which the reference voltage Vref3 is applied and the series connection point between the switching elements Q02 and Q12. Three switching elements Q04, Q13, and Q22 are arranged in series between an L4 terminal to which the reference voltage Vref4 is applied and the output terminal OUT1. One switching element Q05 is arranged between an L5 terminal to which the reference voltage Vref5 is applied and the series connection point between the switching elements Q04 and Q13.

Three switching elements Q06, Q14, and Q23 are arranged in series between an L6 terminal to which the reference voltage Vref6 is applied and the output terminal OUT2. One switching element Q07 is arranged between an L7 terminal to which the reference voltage Vref7 is applied and the series connection point between the switching elements Q06 and Q14. Three switching elements Q08, Q15, and Q24 are arranged in series between an L8 terminal to which the reference voltage Vref8 is applied and the output terminal OUT2. One switching element Q09 is arranged between the GND terminal to which the ground potential $V_{GND}$ is applied and the series connection point between the switching elements Q08 and Q15.

The series connection point between the switching elements Q13 and Q22 is connected to the series connection point between the switching elements Q14 and Q23. Of the 21 switching elements Q00 through Q15 and Q20 through Q24, the switching elements Q00, Q10, and Q20 are composed, for example, of a p-channel MOSFET, and the other switching elements, Q01 through Q09, Q11 through Q15, and Q21 through Q24 are composed of an n-channel MOSFET.

The switching elements Q00, Q01, Q03, Q05, Q07, and Q09 are ON/OFF controlled by the selection control signal D1, and the switching elements Q02, Q04, 06, and Q08 are ON/OFF controlled by the inverted control signal D1b. The switching elements Q10, Q12, and Q14 are ON/OFF controlled by the selection control signal D2, and the switching elements Q11, Q13, and Q15 are ON/OFF controlled by the inverted control signal D2b. The switching elements Q20, Q22, and Q24 are ON/OFF controlled by the selection control signal D3, and the switching elements Q21, and Q23 are ON/OFF controlled by the inverted control signal D3b.

The reference voltage selecting circuit 25 having the construction described above selects a voltage from the voltages given to the terminals: L1 through L8, the power supply terminal Vdd, and the ground terminal GND, corresponding to the selection control signal [D1, D2, D3], which is the binary output [Q1, Q2, Q3] of the counting value M of the counting circuit 28. The selected voltage is given to the output terminal OUT1 or OUT2 that delivers the comparison reference voltage Vhigh or Vlow, respectively. Table 1 shows the process of determining the comparison reference voltages Vhigh and Vlow from the ten terminal voltages according to the selection control signal [D1, D2, D3] as well as the routes to the output terminals OUT1 and OUT2.

TABLE 1

| D3, D2, D1 | Vhigh | Route to OUT1 | Vlow | Route to OUT2 |
|---|---|---|---|---|
| 000 | Vdd | Q00, Q10, Q20 | Vref4 | Q04, Q13, Q23 |
| 100 | Vref1 | Q01, Q11, Q21 | Vref5 | Q05, Q13, Q23 |
| 010 | Vref2 | Q02, Q12, Q21 | Vref6 | Q06, Q14, Q23 |
| 110 | Vref3 | Q03, Q12, Q21 | Vref7 | Q07, Q14, Q23 |
| 001 | Vref4 | Q04, Q13, Q22 | Vref8 | Q08, Q15, Q24 |
| 101 | Vref5 | Q05, Q13, Q22 | $V_{GND}$ | Q09, Q15, Q24 |

As shown in Table 1, the reference voltage selecting circuit 25 selects voltages with six different voltage levels as each of the comparison reference voltages Vhigh and Vlow from the reference voltages Vref1 through Vref8, the power supply voltage Vdd, and the ground potential $V_{GND}$, corresponding to the counting value M [D1, D2, D3] of the counter circuit 28. The comparison reference voltages Vhigh and Vlow is set with the four different levels of voltages because the comparison reference voltages Vhigh and Vlow are allowed to have hysteresis in the comparison process with the voltage Vcap of the capacitors 21 and 22. The hysteresis avoids excessive variation of the number of bottom skips due to insignificant change in the load.

The turn ON control circuit 13 indicated in FIG. 1 includes, as shown in FIG. 2, a counter circuit 40 that counts the bottom detecting signal 'bot' delivered by the bottom detecting circuit 11 and delivers a signal 'botH' when the counting value reaches the output [Q1, Q2, Q3] of the counter circuit 28. The turn ON control circuit 13 also includes a gate circuit 50 that delivers the output 'botH' of the counter circuit 40 as the signal 'bot_out' at the timing of input of the bottom detection signal 'bot'.

Figure 6:
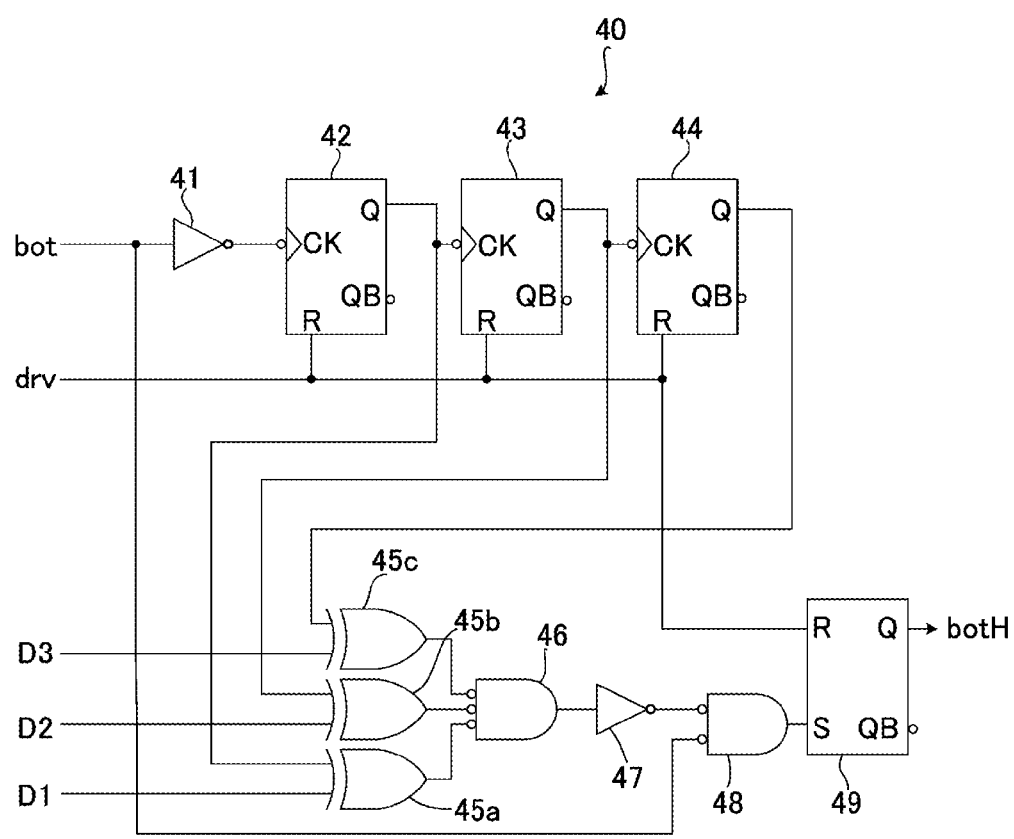
FIG. 6 shows a schematic construction of an example of a counter circuit in a turn ON control circuit.

The counter circuit 40 comprises, as shown in FIG. 6, for example, T flip-flops 42, 43, and 44 that are in three stage cascade connection and receive the bottom detecting signal 'bot' through the NOT circuit 41 to perform inverting operation. The flip-flops 42, 43, and 44 compose a counting section that is reset by the driving signal 'drv' and counts the number of input of the bottom detecting signal 'bot'. The counter circuit 40 also comprises exclusive OR (EX-OR) circuits 45a, 45b, and 45c that execute logical processing between the outputs of the flip-flops 42, 43, and 44, and the counting value M [D1, D2, D3], which is the output [Q1, Q2, Q3] of the counter circuit 28.

A negative logic input type AND circuit 46 executes processing of logical product of the outputs of the exclusive OR circuits 45a, 45b, and 45c, thereby detecting matching between the outputs of the flip-flops 42, 43, and 44, which are the number of input of the bottom detecting signals 'bot', and the counting value M [D1, D2, D3]. The output signal, a matching detection signal, of this AND circuit 46 is inverted through a NOT circuit 47 and then given to an AND circuit 48, an AND gate, in which a processing of a logical product with the bottom detecting signal 'bot' is executed. The AND gate 48 sets a flip-flop 49 that is initialized by resetting with the driving signal 'drv', synchronously with the bottom detecting signal 'bot'.

Upon setting of the flip-flop 49, the signal 'botH' mentioned earlier is delivered from the flip-flop 49 at the timing the number of input of the bottom detecting signal 'bot' reaches the counting value M. The signal 'botH' is delivered through the gate circuit 50 in synchronization with the timing of detecting the bottom detecting signal 'bot', as the signal 'bot_out' for regulating turning ON timing of the switching element Q1.

In the quasi-resonance switching power supply as described above, the bottom skipping number determining circuit 12 determines the optimum number of bottom skips M based on the variation of the voltage Vcap charged on the capacitors 21 and 22 corresponding to the ON-OFF period of the switching element Q1 i.e., based on the variation of the voltage Vcap corresponding to the magnitude of the load. More specifically, when the load changes from a normal load condition to a light load condition, the voltage Vcap decreases corresponding to the ON-OFF width of the switching element Q1.

Figure 7:
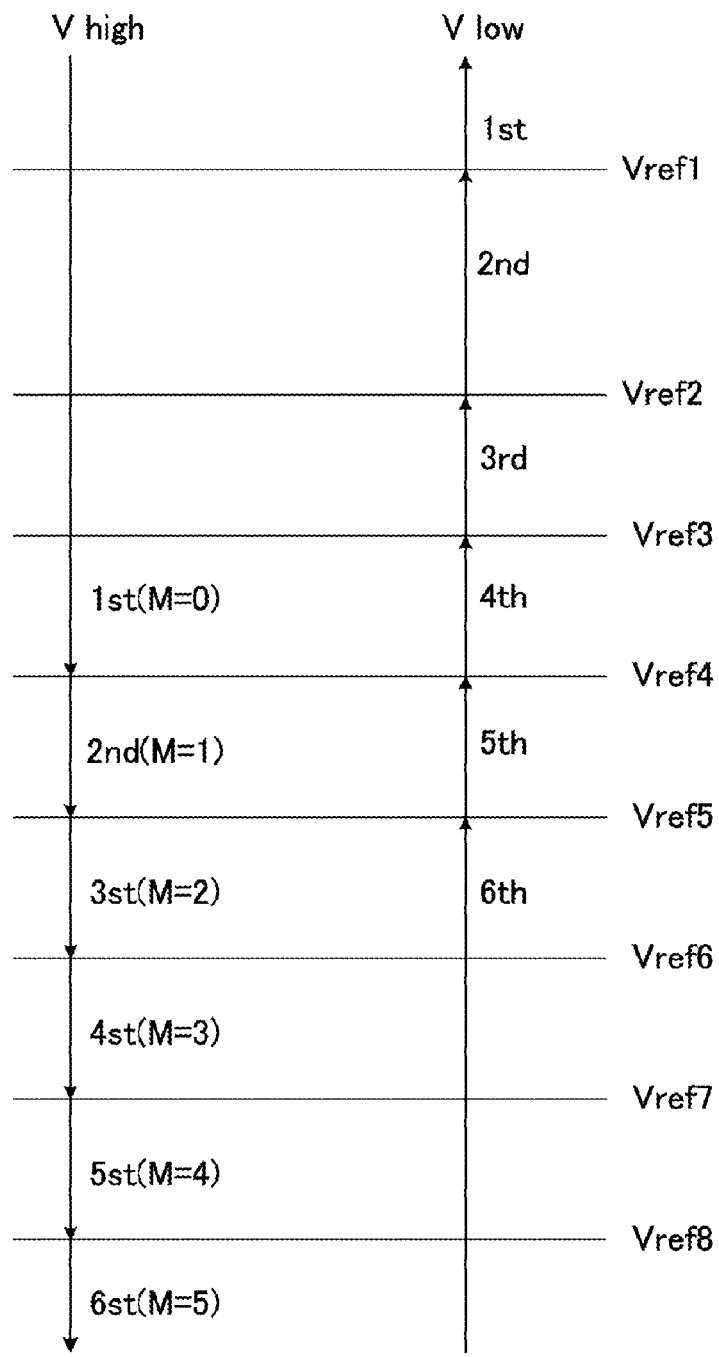
FIG. 7 shows an example of reference voltage selection corresponding to the load in a reference voltage selecting circuit.

When the voltage Vcap becomes below the comparison reference voltage Vhigh, the counter circuit 28 conducts, as shown in FIG. 7, increment processing (+1) on the counting value M to set the comparison reference voltage Vhigh to be a one step lower value. The processing of incrementing on the counting value M and revision of the comparison reference voltage Vhigh are repeated until the lowered comparison reference voltage Vhigh exceeds the voltage Vcap. With the change of the comparison reference voltage Vhigh, the comparison reference voltage Vlow also changes as shown in Table 1.

When the load becomes a heavy load condition from a light load condition and the voltage Vcap becomes higher than the comparison reference voltage Vlow, the counter circuit 28 conducts, as shown in FIG. 7, decrement processing (−1) on the counting value M to set the comparison reference voltage Vlow to be a one-step higher value. The processing of decrementing on the counting value M and revision of the comparison reference voltage Vlow are repeated until the increased comparison reference voltage Vlow becomes lower than the voltage Vcap. In this case too, with the change of the comparison reference voltage Vlow, the comparison reference voltage Vhigh also changes as shown in Table 1.

Figure 8:
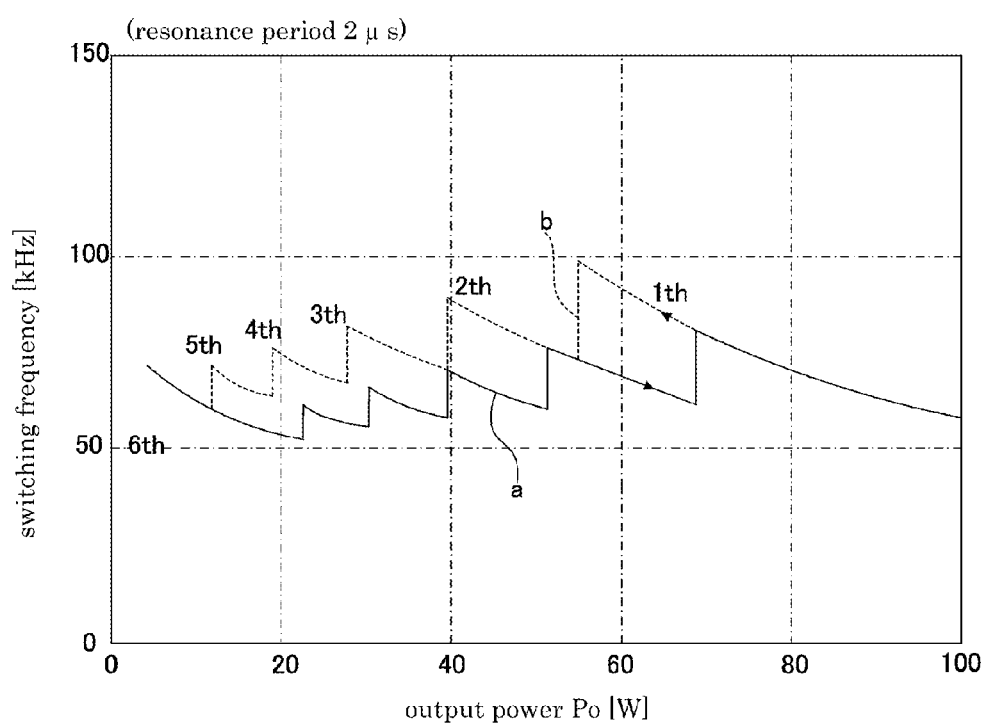
FIG. 8 shows variation of the switching frequency and variation of the number of skips in dependence on variation of the output voltage or variation of load condition.
Figure 9:
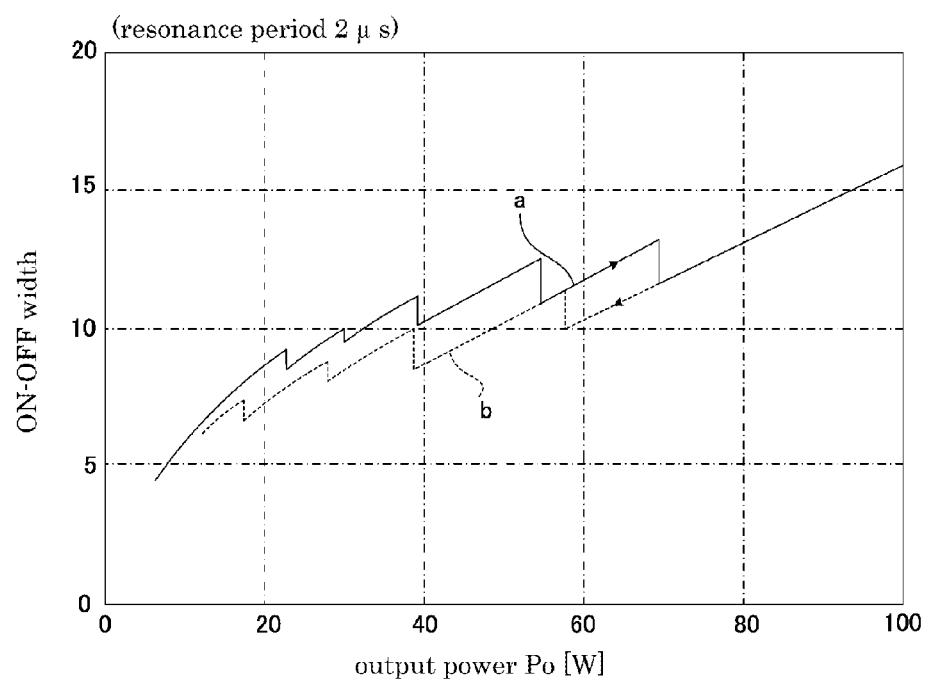
FIG. 9 shows variation of an ON-OFF width and variation of the number of bottom skips in dependence on variation of the output voltage or variation of load condition.

FIG. 8 shows variation of switching frequency and variation of the number of bottom skips when the load i.e. the output power Po changes under the above-described bottom skip control in the quasi-resonance switching power supply of the invention. FIG. 9 shows variation of ON-OFF width and the number of bottom skips when the load i.e. the output power Po changes under the bottom skip control. The switching characteristics shown in FIG. 8 and FIG. 9 are for quasi-resonance period of 2 μs, and the solid curve 'a' indicates a characteristic curve when the output power Po increases and the dotted curve 'b' indicates a characteristic curve when the output power Po decreases.

As clearly shown by the characteristic curves in FIG. 8 and FIG. 9, the quasi-resonance switching power supply of the invention reduces the switching frequency by setting a larger value to the number of skips indicated by the counting value M as the load becomes lighter. At the same time, the ON-OFF width of the switching element Q1 is controlled to a small value. Therefore, the loss in the switching element Q1 is restricted to a remarkably small value.

In a quasi-resonance switching power supply of the invention, in particular, the processing of incrementing and decrementing of the counting value M accompanied by variation of the comparison reference voltages Vhigh and Vlow is repeatedly executed at multiple times during one switching period of the switching element Q1 based on the voltage Vcap held on the capacitors 21 and 22. Even if the load abruptly changes, a new number of bottom skips i.e. the counting value M is set corresponding to the changed magnitude of the load within the one switching period of the switching element Q1. Therefore, bottom skip control is performed following load variation with quick response.

Figure 10:
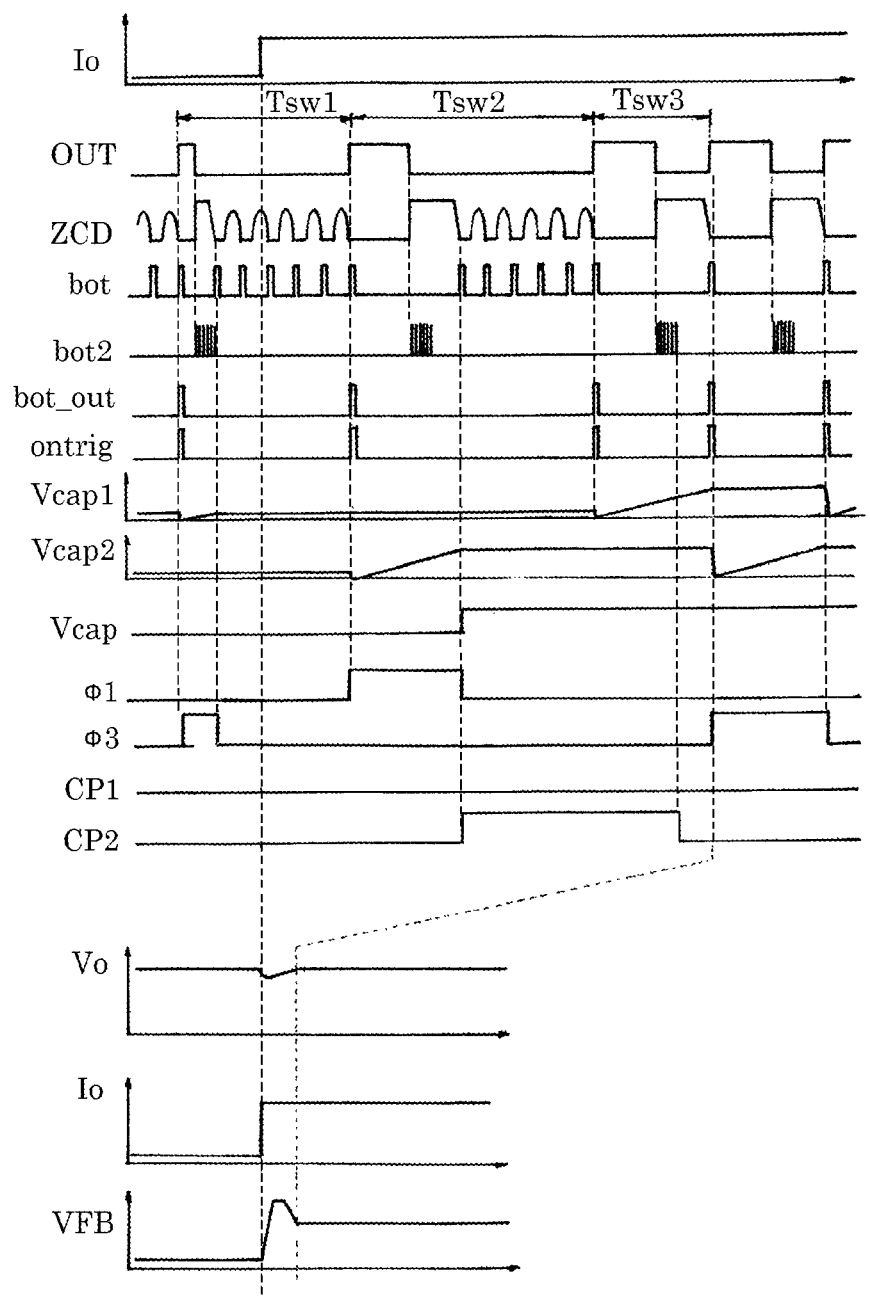
FIG. 10 is a time chart showing a process of abrupt transition from a light load condition to a heavy load condition in a quasi-resonant switching power supply according to an embodiment of the present invention.

FIG. 10 is a timing chart of an example of operation in a case in which the load becomes abruptly a heavy load condition from a light load condition. When the load abruptly becomes heavy in a certain switching period Tsw1, a voltage Vcap is accumulated on the capacitor 21 (or 22) corresponding to the ON-OFF width according to the changed magnitude of the load during the next switching period Tsw2. The voltage Vcap accumulated on the capacitor 21 (or 22) is compared with the comparison reference voltages Vhigh and Vlow repeatedly in the following switching period Tsw3 to determine the number of bottom skips corresponding to the voltage Vcap. As a result, appropriate bottom skip control is performed corresponding to the magnitude of the load very quickly, after two switching periods, thereby stabilizing the output voltage Vo rapidly.

Meanwhile, the following procedure could be assumed for conducting up-down processing on the counting value M of the counter circuit 28 corresponding to a load condition. At the timing of turning ON of the switching element Q1 in every switching period of the switching element Q1, charging with a constant current is started on the capacitor 21 (or 22). At the timing of detecting the first bottom in the resonant oscillation voltage, the charged voltage Vcap on the capacitor 21 (or 22) is detected. Then, the charged voltage Vcap on the capacitor 21 (or 22) is compared with the comparison reference voltage Vhigh and Vlow. According to the comparison result, the comparison reference voltages Vhigh and Vlow are changed by one step.

Figure 11:
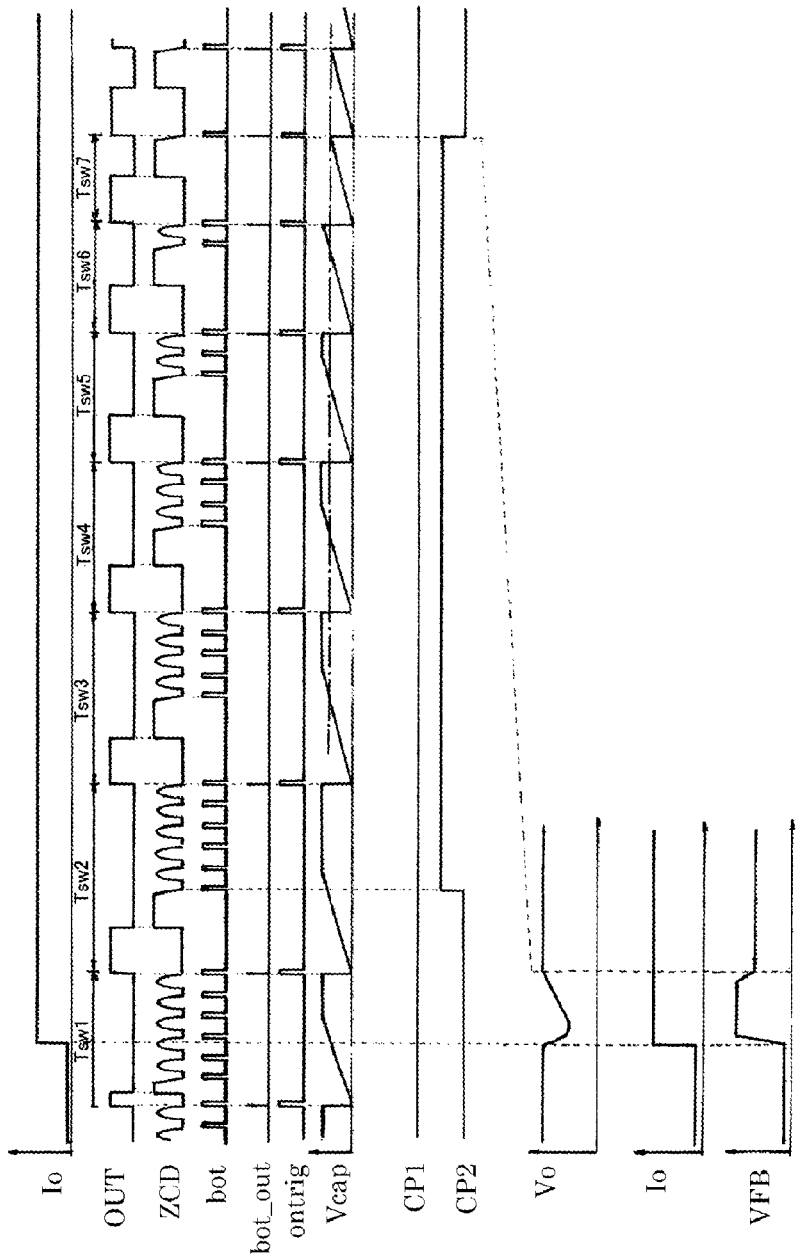
FIG. 11 is a time chart showing a process of abrupt transition from a light load condition to a heavy load condition in a quasi-resonant switching power supply according to a conventional technology.

The procedure, however, needs to detect again a charging voltage Vcap corresponding to the ON-OFF width of the switching element Q1 in the next one switching period, and the charged voltage Vcap is compared with the changed comparison reference voltages Vhigh and Vlow. In other words, the comparison between the voltage Vcap and the comparison reference voltages Vhigh and Vlow can be conducted only once in one switching period of the switching element Q1. Moreover, the comparison reference voltages Vhigh and Vlow can be revised by only one step in one switching period. Thus, when the load changes in a large range, as shown in FIG. 11, bottom skipping control does not settle down until switching of the switching element Q1 is repeated several times. Thus, several switching periods are needed to set the number of bottom skips appropriate for the load condition.

Concerning this point, a quasi-resonance switching power supply of the invention determines the number of bottom skips, i.e. the counting value M corresponding to the load in the next one switching period even if the load changes abruptly. Thus, bottom skip control is performed with immediate response, which is a great advantage in practical application. In addition, the basic construction of the invented switching power supply is simple in which the voltage Vcap corresponding to the ON-OFF with of the switching element Q1 is accumulated on the capacitors 21 and 22 alternately and the accumulated voltage Vcap is held in the capacitors 21 and 22 over the next one switching period. This construction allows comparison processing with the comparison reference voltages Vhigh and Vlow and revision of the counting value M at multiple times in one switching period. Therefore, quick response is achieved for bottom skip control simply and effectively.

The present invention should not be limited to the embodiment described thus far. For example in the embodiment described above, the capacitors 21 and 22 are charged to a voltage corresponding to the ON-OFF width i.e. the period from the timing of turning ON of the switching element Q1 to the timing of detection of the first bottom in the resonant voltage after turning OFF of the switching element Q1. However, the capacitors 21 and 22 can be charged to a voltage corresponding to the ON width of the switching element Q1. Or alternatively, the capacitors 21 and 22 can be charged to a voltage corresponding to the current running through the switching element Q1 at the time of turning OFF of the switching element Q1.

The ON width and the turn OFF time of the switching element Q1 is generally shorter than one switching period of the switching element Q1. Consequently, after completion of charging on the capacitors 21 and 22, the ON period of the switching element Q1 can be utilized for comparing the voltage Vcap on the capacitors 21 and 22 with the comparison reference voltages Vhigh and Vlow at multiple times to settle the number of bottom skips.

In this case, it would be unnecessary to use the two capacitors alternately in one switching period and the next switching period, resulting in a simpler construction. However, the procedure needs the comparison between the voltage Vcap and the comparison reference voltages Vhigh and Vlow and processing of revising the comparison reference voltages Vhigh and Vlow at multiple times in a short period of time, thus requiring a faster processing circuit. Therefore, even in the case in which the voltage Vcap on the capacitors 21 (or 22) is determined from the ON width or from the voltage corresponding to the current running at the time of turning OFF of the switching element Q1, the construction of FIG. 2 is preferably employed.

In the embodiment example described above, the bottom skipping control is conducted with the maximum number of bottom skips of six. The maximum number of skips is not limited to a special value, but can be sufficiently determined according to the specifications such as the resonant oscillation frequency. The switching element Q1 can be an IGBT, performing the same operation and effects. The present invention can be applied with various modifications without departing from the spirit and scope of the invention.

DESCRIPTION OF SYMBOLS

Q1: switching element, a MOSFET, for example
T: transformer
Cr: resonance capacitor
1: control circuit
2: feedback circuit
11: bottom detecting circuit
12: bottom skipping number determining circuit
13: turn ON control circuit
16: flip-flop
18: comparator
21, 22: capacitor
23, 24: comparator
25: reference voltage selecting circuit
25a, 25b, 25c: NOT circuit
Q00, Q01 to Q24: switching element
26, 27: flip-flop
28: counter circuit 28a: up-down counter
28b, 28c: input gate circuit
28d, 28e: AND circuit
30: selection operation control circuit
31: pulse generation circuit
32: flip-flop
40: counter circuit
41, 47: NOT circuit
42, 43, 44, 49: flip-flop
45a, 45b, 45c: exclusive OR circuit (EX-OR)
46, 48: AND circuit
51, 52, 55, 56: analogue switch
53: constant current source
54: switching element, MOSFET, for example
60: timing circuit
61, 62: flip-flop
63, 64: AND circuit

What is claimed is:

1. A quasi-resonance switching power supply that utilizes resonance phenomenon in a resonance circuit including an inductance and a resonance capacitor connected to an ON-OFF driven switching element of the quasi-resonance switching power supply, and that turns ON the switching element at a timing of a bottom of a resonant voltage, the quasi-resonance switching power supply comprising:
   a bottom detecting circuit that detects a bottom of the resonant voltage developed upon turning OFF of the switching element;
   a bottom skipping number determining circuit that determines a number of bottom skips corresponding to a load of the switching element; and
   a turn ON control circuit that turns ON the switching element when a number of bottoms detected by the bottom detecting circuit reaches the number of bottom skips determined by the bottom skipping number determining circuit; wherein
   the bottom skipping number determining circuit comprises a capacitor that holds a voltage corresponding to the load of the switching element over one switching period of the switching element, and sequentially compares the voltage held on the capacitor with a plurality of reference voltages for determining the number of bottom skips in one switching period of the switching element to determine the number of bottom skips corresponding to the voltage held on the capacitor.

2. The quasi-resonance switching power supply according to claim 1,
   wherein
   the plurality of reference voltages for determining the number of bottom skips correspond to delay times after a timing of turning OFF of the switching element; and
   the bottom skipping number determining circuit comprises:
   an up-down counter that increases or decreases the number of bottom skips according to a comparison result between the voltage held on the capacitor with an upper limit voltage and a lower limit voltage set by selecting from the plurality of reference voltages;
   a reference voltage selecting circuit that changes reference voltages set as the upper limit voltage and the lower limit voltage corresponding to the number of bottom skips set in the up-down counter; and
   a selection operation control circuit that instructs the reference voltage selecting circuit to execute changing processing for the reference voltages at multiple times in one switching period of the switching element to settle the number of bottom skips set in the up-down counter.

3. The quasi-resonance switching power supply according to claim 2 wherein
   the plurality of reference voltages for determining the number of bottom skips are (N+1) different voltages that divide a range of the voltages held on the capacitors into N steps corresponding to a magnitude of the load of the switching element, N being an integer of two or larger; and
   the reference voltage selecting circuit selects, from the plurality of reference voltages, the upper limit voltage and the lower limit voltage to specify a variation-permitting range of the voltage held on the capacitor according to a value of the up-down counter indicating the number of bottom skips.

4. The quasi-resonance switching power supply according to claim 2, wherein the up-down counter performs processing of decrementing of the number of bottom skips and processing of incrementing of the number of bottom skips triggered by the selection operation control circuit repeatedly at multiple times in one switching period, the processing of decrementing being executed when the voltage held on the capacitor is higher than the upper limit voltage and the processing of incrementing being executed when the voltage held on the capacitor is lower than the lower limit voltage.

5. The quasi-resonance switching power supply according to claim 1, wherein
   the voltage corresponding to the load of the switching element is a voltage corresponding to a period of time from a timing of turning ON of the switching element to a timing of detecting a first bottom of the resonant oscillation voltage after turning OFF of the switching element.

6. The quasi-resonance switching power supply according to claim 5, wherein
   the capacitor is composed of first and second capacitors provided in parallel; and
   the voltage corresponding to the period of time from a timing of turning ON of the switching element to a timing of detecting a first bottom of the resonant oscillation voltage after turning OFF of the switching element is accumulated on the first and second capacitors alternately in every switching period of the switching element and held over the next one switching period of the switching element to deliver for determining the number of bottom skips in the bottom skipping number determining circuit.

7. The quasi-resonance switching power supply according to claim 1, wherein the voltage corresponding to the load of the switching element is a voltage corresponding to an ON period of time of the switching element.

8. The quasi-resonance switching power supply according to claim 1, wherein the voltage corresponding to the load of the switching element is a voltage corresponding to a current running through the switching element at a time of turning OFF of the switching element.

9. An apparatus, comprising:
   a minimum value detecting circuit configured to detect occurrences of a minimum value of a resonant oscillation voltage in a switching power supply including an inductance, a resonance capacitor and a switching element having a switching period;

a number determining circuit configured to determine a number M, M being a natural number including zero, of bottom skips corresponding to a load condition for the switching period; and a control circuit configured to switch the switching element based on the minimum value detecting circuit detecting a number of occurrences of a minimum value of the resonant oscillation voltage corresponding to the number M;

wherein the number determining circuit includes a voltage holding element configured to hold, over the switching period of the switching element, a voltage corresponding to the load condition; and the number determining circuit is configured to perform a comparison of the held voltage with at least one reference voltage, the at least one reference voltage including a plurality of reference voltages respectively corresponding to delay times, to determine the number M, select an upper limit voltage and a lower limit voltage from among the plurality of reference voltages, and increment or decrement the number M based on a comparison of the held voltage with the upper limit voltage and the lower limit voltage.

10. The apparatus of claim 9, wherein the number determining circuit is further configured to change a selection of the upper limit voltage and the lower limit voltage based on a value of the held voltage.

11. The apparatus of claim 10, wherein the number determining circuit is further configured to change the selection of the upper limit voltage and the lower limit voltage multiple times during the switching period.

12. The apparatus of claim 9, wherein the voltage holding element includes at least one capacitor.

* * * * *